US012163434B1

(12) United States Patent
Harner et al.

(10) Patent No.: US 12,163,434 B1
(45) Date of Patent: Dec. 10, 2024

(54) ADVANCED THERMALLY CONDUCTIVE LIGHTWEIGHT ELASTOMERIC SEAL

(71) Applicant: Raytheon Technologies Corporation, Farmington, CT (US)

(72) Inventors: John Harner, Florence, MA (US); Robert Kruzel, Windsor Locks, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/215,308

(22) Filed: Jun. 28, 2023

(51) Int. Cl.
*F01D 11/12* (2006.01)

(52) U.S. Cl.
CPC ........ *F01D 11/122* (2013.01); *F05D 2240/14* (2013.01); *F05D 2240/55* (2013.01); *F05D 2300/431* (2013.01); *F05D 2300/501* (2013.01); *F05D 2300/5024* (2013.01); *F05D 2300/522* (2013.01); *F05D 2300/603* (2013.01); *F05D 2300/61* (2013.01); *F05D 2300/615* (2013.01)

(58) Field of Classification Search
CPC .... F01D 11/122; F01D 11/127; F01D 11/125; F01D 11/12; F01D 25/24; F01D 5/28; F01D 5/288; F01D 11/001; F01D 11/02; F01D 21/045; F01D 25/005; F05D 2220/36; F05D 2300/437; F05D 2300/61; F05D 2240/11; F05D 2240/14; F05D 2240/55; F05D 2300/173; F05D 2300/501; F05D 2300/5024; F05D 2300/522; F05D 2300/603; F05D 2300/10; F05D 2300/612; F05D 2300/615; F05D 2300/431; F04D 29/164; F04D 29/526; F04D 29/023; F04D 19/002
See application file for complete search history.

(56) References Cited

U.S. PATENT DOCUMENTS

| | | | | |
|---|---|---|---|---|
| 5,780,146 | A * | 7/1998 | Mason | C04B 28/34 428/328 |
| 5,948,856 | A * | 9/1999 | Juen | C08K 7/22 524/847 |
| 6,899,339 | B2 * | 5/2005 | Sanders | F01D 11/122 277/355 |
| 10,030,532 | B2 * | 7/2018 | Eastman | F01D 11/122 |
| 10,408,078 | B2 | 9/2019 | Strock et al. | |
| 2001/0055652 | A1 * | 12/2001 | Dalzell, Jr. | F01D 11/122 427/447 |
| 2015/0167497 | A1 * | 6/2015 | Hannecart | F01D 25/24 29/889.22 |

* cited by examiner

*Primary Examiner* — Eric J Zamora Alvarez
(74) *Attorney, Agent, or Firm* — Bachman & LaPointe, P.C.

(57) ABSTRACT

A thermally conductive lightweight elastomeric seal including a stator substrate having an external surface; a casing coupled to the external surface, the casing including radial walls extending orthogonal radially from the external surface; an abradable material disposed within the casing, the abradable material comprises an elastomer material with imbedded metal-coated hollow microspheres, wherein the abradable material comprises a density of 0.5 to 0.6 grams/cubic centimeter; the abradable material and the casing being coupled together.

18 Claims, 2 Drawing Sheets

ADVANCED THERMALLY CONDUCTIVE LIGHTWEIGHT ELASTOMERIC SEAL

BACKGROUND

The present disclosure is directed to an improved abradable seal including elastomer matrix with thermally conductive microsphere filler.

Knife edge seals present issues during rub events as heat generated between the rotor tip and the seal material dramatically increases the temperature of the seal and associated rotor tip. Attempts to reduce the heat generated during rub events have produced abradable seals with lower density materials.

Polyimide foam is used as an abradable seal in sections of a compressor of a gas turbine engine. For example, the foam is mounted on a static case or vane structure. The compressor rotor includes the knife edge that contacts the foam. The knife edge abrades the foam to form a groove that provides a tight clearance and limits gas leakage.

What is needed is an improved abradable seal material that can better dissipate unwanted thermal energy during rub events.

SUMMARY

In accordance with the present disclosure, there is provided a thermally conductive lightweight elastomeric seal comprising: a stator substrate having an external surface; a casing coupled to the external surface, the casing including radial walls extending orthogonal radially from the external surface; an abradable material disposed within the casing, the abradable material comprises an elastomer material with imbedded metal-coated hollow microspheres, wherein the abradable material comprises a density of 0.5 to 0.6 grams/cubic centimeter; and the abradable material and the casing being coupled together.

A further embodiment of any of the foregoing embodiments may additionally and/or alternatively include that the casing includes a floor directly coupled to the exterior surface and coupled to the abradable material.

A further embodiment of any of the foregoing embodiments may additionally and/or alternatively include that the elastomer material is selected from the group consisting of nitrile, polyurethane, viton and silicone.

A further embodiment of any of the foregoing embodiments may additionally and/or alternatively include that the abradable material comprises elastic moduli ranging from 200-500 pounds per square inch.

A further embodiment of any of the foregoing embodiments may additionally and/or alternatively include that the abradable material comprises thermal conductivities ranging from 1.3-2.0 W/mK.

A further embodiment of any of the foregoing embodiments may additionally and/or alternatively include that the radial walls extending orthogonal radially from the exterior surface are configured to contain the abradable material within the radial walls, relative to an axis A.

A further embodiment of any of the foregoing embodiments may additionally and/or alternatively include that the casing and the abradable material comprise a ratio of elastic modulus of casing to abradable of 50-5000X.

In accordance with the present disclosure, there is provided a thermally conductive lightweight elastomeric seal for a gas turbine engine rotor and stator comprising: a stator substrate having an external surface; a casing coupled to the external surface, the casing including radial walls extending radially from the external surface; an abradable material disposed within the casing radial walls relative to an axis A, the abradable material comprises an elastomer material with imbedded metal-coated hollow microspheres, wherein the abradable material comprises a density of 0.5 to 0.6 grams/cubic centimeter; and the abradable material and the casing being coupled together.

A further embodiment of any of the foregoing embodiments may additionally and/or alternatively include that the metal-coated hollow microspheres are pretreated with a chemical coupling agent.

A further embodiment of any of the foregoing embodiments may additionally and/or alternatively include that the casing comprises a material selected from the group consisting of polyether ketone, polyether ether ketone, polyetherimide, polyamide imide, polyphenylene sulfide or polyphenylsulfone and a reinforced thermoset organic matrix composite such as an epoxy or imide-based resin reinforced with carbon or glass fibers or fabric.

A further embodiment of any of the foregoing embodiments may additionally and/or alternatively include that the reinforced thermoset organic matrix composite is selected from the group consisting of an epoxy or imide-based resin reinforced with at least one of a carbon fiber, a glass fiber and a fabric, wherein the fabric includes carbon or glass.

A further embodiment of any of the foregoing embodiments may additionally and/or alternatively include that the casing comprises neat or reinforced thermoplastic.

A further embodiment of any of the foregoing embodiments may additionally and/or alternatively include that the elastomer material is selected from the group consisting of nitrile, polyurethane, viton and silicone.

In accordance with the present disclosure, there is provided a gas turbine engine abradable seal thermal conduction process comprising: providing a stator substrate having an external surface; coupling a casing to the external surface, the casing including radial walls extending radially from the external surface; disposing an abradable material within the casing radial walls relative to an axis A, wherein the abradable material comprises an elastomer material with imbedded metal-coated hollow microspheres, wherein the abradable material comprises a density of 0.5 to 0.6 grams/cubic centimeter; and coupling the abradable material and the casing together.

A further embodiment of any of the foregoing embodiments may additionally and/or alternatively include that the casing includes a floor directly coupled to the exterior surface; and coupling the floor to the abradable material.

A further embodiment of any of the foregoing embodiments may additionally and/or alternatively include that the casing and the abradable material comprise a ratio of elastic modulus of casing to abradable of 50-5000X.

A further embodiment of any of the foregoing embodiments may additionally and/or alternatively include that the elastomer material is selected from the group consisting of nitrile, polyurethane, viton and silicone.

A further embodiment of any of the foregoing embodiments may additionally and/or alternatively include that the process further comprising fabricating the gas turbine engine abradable seal in-situ with low modulus abradable material loaded and cured into the casing following installation of the abradable seal.

A further embodiment of any of the foregoing embodiments may additionally and/or alternatively include that the abradable material comprises elastic moduli ranging from 200-500 pounds per square inch.

A further embodiment of any of the foregoing embodiments may additionally and/or alternatively include that the abradable material comprises thermal conductivities ranging from 1.3-2.0 W/mK.

Other details of the thermally conductive lightweight elastomeric seal are set forth in the following detailed description and the accompanying drawings wherein like reference numerals depict like elements.

DETAILED DESCRIPTION

Figure 1:
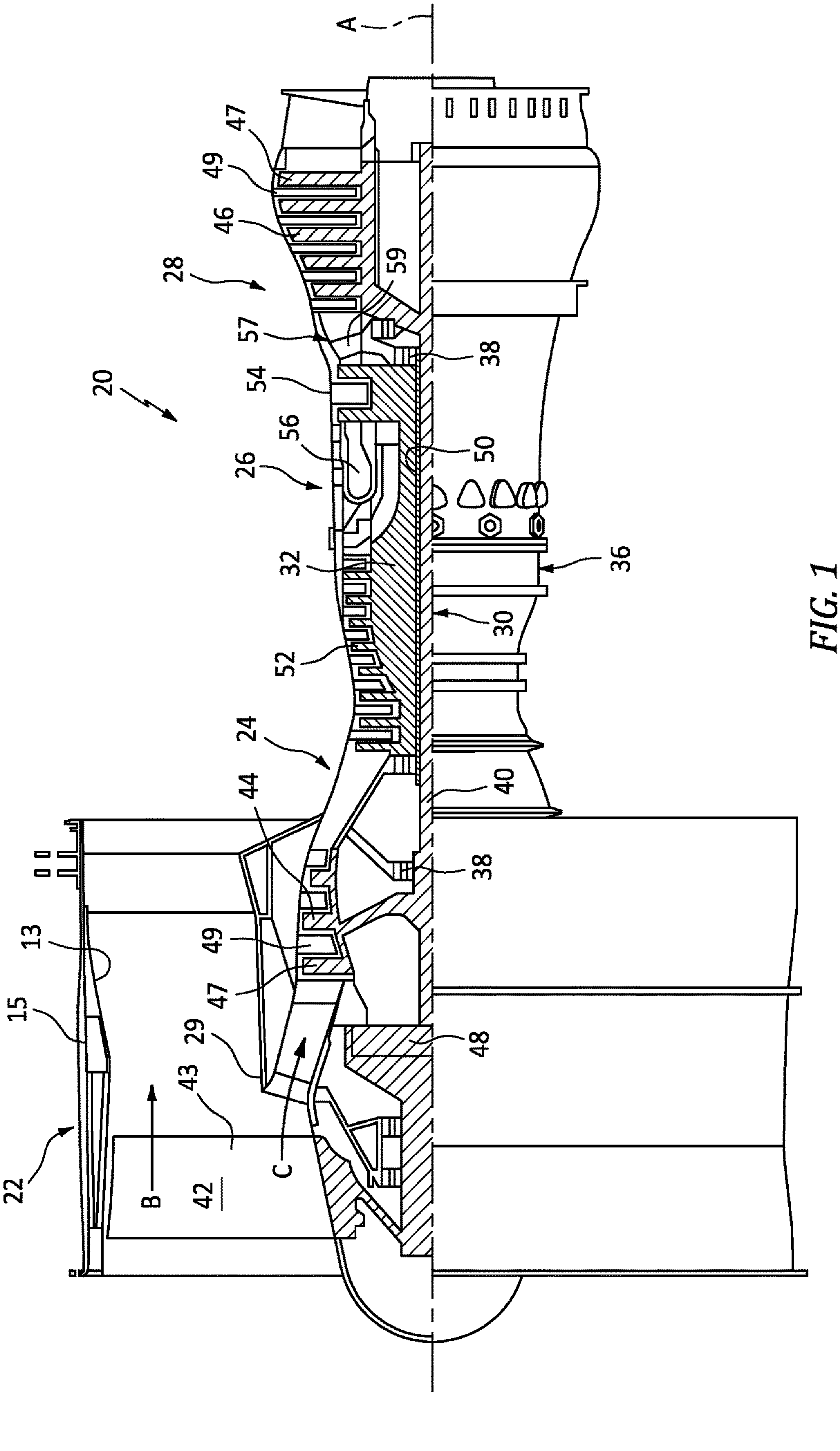
FIG. 1 is a schematic longitudinal sectional view of a turbofan engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of static vanes adjacent the rotatable airfoils. The rotatable airfoils and vanes are schematically indicated at 47 and 49.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft. (10, 668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Low fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The low fan pressure ratio is a span-wise average of the pressure ratios measured across the fan blade 43 alone over radial positions corresponding to the distance. The low fan pressure ratio can be less than or equal to 1.45, or more narrowly greater than or equal to 1.25, such as between 1.30 and 1.40. "LOW corrected fan tip speed" is the actual fan tip speed in feet/second divided by an industry standard temperature correction of $[(\text{Tram}° \text{ R})/(518.7° \text{ R})]^{0.5}$. The "low corrected fan tip speed" can be less than or equal to 1150.0 feet/second (350.5 meters/second), and greater than or equal to 1000.0 feet/second (304.8 meters/second).

Figure 2:
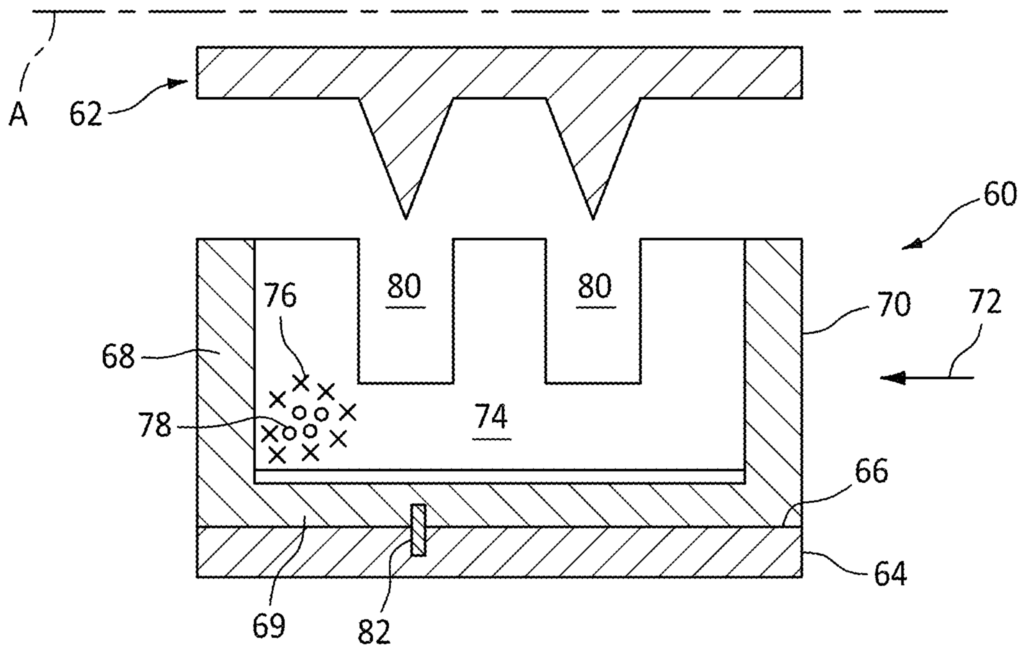
FIG. 2 is a cross sectional schematic of an exemplary abradable seal.
Figure 3:
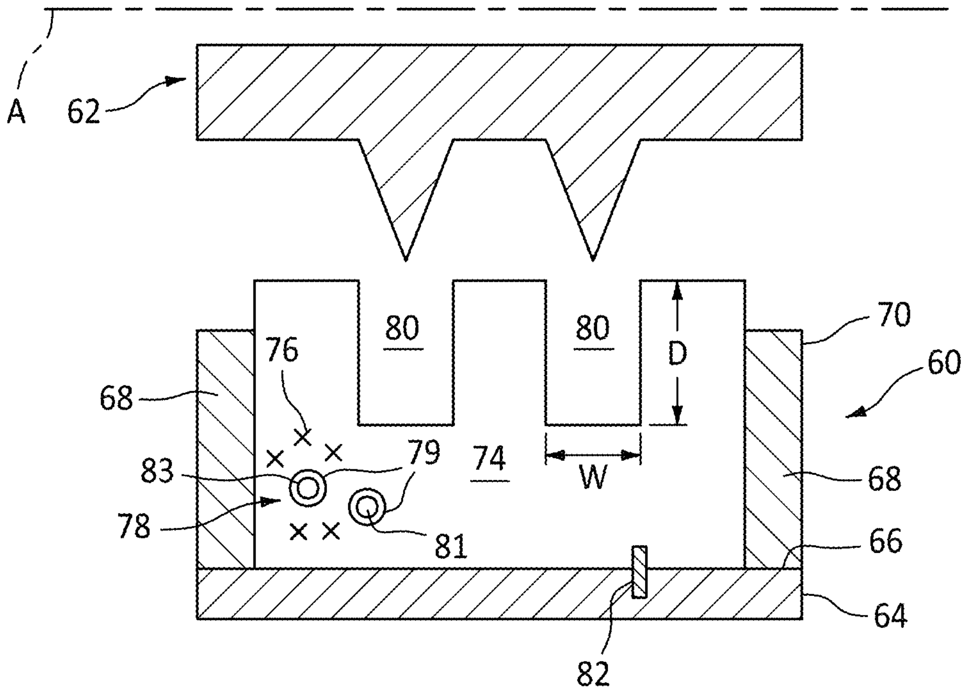
FIG. 3 is a schematic representation of an example abradable seal that includes multi-layer wall microspheres.

Referring also to FIG. 2 and FIG. 3, a seal 60 is shown. The seal 60 can be an abradable seal 60 proximate a knife edge rotor 62. The rotor 62 rotates around axis A. The abradable seal 60 is configured to interact with the rotor 62 and provide a sealing function. The knife edge rotor 62 can interact with the abradable seal 60 and can cause wear to the abradable seal 60.

The abradable seal 60 includes a stator substrate 64. The substrate 64 has an exterior surface 66. A casing 68 can be disposed on the exterior surface 66. The casing 68 can be a material that includes a stiffness that resists deflection. In an exemplary embodiment, the casing 68 material can include a thermoplastic. In another exemplary embodiment, the casing 68 can include neat or reinforced thermoplastic such as but not limited to polyether ketone, polyether ether ketone, polyetherimide, polyamide imide, polyphenylene sulfide or polyphenylsulfone or a reinforced thermoset organic matrix composite such as an epoxy or imide-based resin reinforced with carbon or glass fibers or fabric. The casing 68 can include an optional floor 69, as shown in FIG. 2. The casing 68 can include radial walls 70. The radial walls 70 can range from about 0.050 to about 0.25 inches thick. This thickness provides the necessary support to withstand the deflection induced by the internal air flow forces 72.

A low density abradable material 74 can be disposed within the casing 68. The abradable material 74 can be partially disposed within the casing 68 and axially contained within the radial walls 70, relative to axis A. The abradable material 74 can be exposed to the rotor 62 with no casing 68 between the rotor 62 and abradable material 74. The abradable material 74 can be disposed directly onto the exterior surface 66, in an exemplary embodiment, when there is no casing floor 69, as shown in FIG. 3.

The abradable material 74 can include low elastic moduli. The abradable material 74 can comprise a lightweight abradable with imbedded hollow metal-coated carbon or glass microspheres 78 creating a material with a density of from about 0.5 to about 0.65 grams/cubic centimeter. The metal coating 79 can be selected from one or more metals to provide enhanced thermal conductivity. The metal can be selected from platinum, gold, silver, palladium, copper, nickel, zirconium, aluminum, iron, antimony, bismuth, beryllium, zinc or combinations or alloys thereof. In addition to thermal conductivity, the given metals can also be selected for resistance to oxidation corrosion or the like at a given environmental conditions in the compressor 24. The metal-coated hollow microspheres 78 are pretreated with a chemical coupling agent, e.g.; an adhesion promoter which include chemicals that act to enhance adhesion between two materials.

The microspheres 78 can include a single-layer wall of the selected metal or metals enclosing an interior cavity 81. For example, the interior cavity 81 is hollow and generally free of any solid or liquid substances, but may include one or more gases. The thermally conductive microspheres 78 can be constructed of a multi-layer wall that includes a support layer 83 and a metallic layer 79 on the support layer 83. For example, the metallic layer 79 can be of one or more of the metals described above with regard to the microspheres 78. The support layer 83 can be formed of at least one of a polymer-based material or a ceramic-based material, or some metallic microspheres 78 of polymer-based material and others of ceramic-based material. The support layer 83 provides a relatively strong structure for supporting a thin coating layer of metal as the metallic layer 79. In this regard, a minimal amount of the metal or metals can be used to reduce weight. For example, the radial thickness of the metallic layer 79 can be less than one micrometer. In further examples, the thickness can be 1-200 nanometers.

In an exemplary embodiment, the casing 68 can relate to the abradable material 74 with a ratio of elastic modulus of casing to abradable of about 50-5000X.

In an exemplary embodiment, the abradable material 74 consisting of elastomer material 76, such as silicone filled to a high volume percentage of hollow metal-coated microspheres 78 creates an overall low density material which has shown to significantly reduce the evolved temperature during rub events. Higher concentrations of metal-coated microspheres 78 perform the best as elimination of compressible elastomer reduces heat generation. The high volume or high concentration of metal-coated microspheres 78 can be the range of 60-70% metal-coated microspheres 78 by volume. The high concentration of metal-coated microspheres 78 by volume can range from about 65%-70% by volume.

In an exemplary embodiment, the abradable seal 60 can include channels 80 cut into the abradable material 74. The depth D and width W of the channels 80 can be predetermined dimensions. In an exemplary embodiment, the width D can range from 0.15-0.30 inches; the depth D can range from 0.125-0.50 inches. The channels 80 can be cut to prevent any rub of the seal 60 which prevents heat build-up.

In an exemplary embodiment, at least one of the abradable material 74 and the casing 68 can be attached to the stator substrate 64 via an imbedded mechanical fastener 82. The abradable seal 60 can be fabricated in-situ with low modulus material 74 loaded and cured into the casing 68 following installation of the seal 60.

The structures shown in this disclosure are for descriptive purposes and are not to scale or proportion. Compared with semi-crystalline polymers, elastomers (i.e., nitrile, polyurethane, viton, silicone) are generally abrasion resistant due to their inherent compressibility but can provide critical dampening and lubricity behavior to a sealing system. Due to a lower modulus of elasticity (elastomer: 150-1000 psi vs.

typical semi-crystalline polymer: 40,000-60,000 psi), elastomers compress during incursion events locally densifying the substance and generating local high temperatures due to friction.

The addition of fillers improves the abradability of elastomers at the expense of material thermal conductivity. At filler concentrations where abradable seal specific gravity approaches 0.5-0.6 g/cc (50-60 vol % filler), excessive heat is generated locally causing significant material degradation.

Using metal-coated hollow microspheres 78 in concentrations of >60 vol % provide a thermal conductive network which allows local heat generation to be better distributed throughout the seal 60 while also providing the necessary material hardness to create an abradable material 74.

In an exemplary embodiment, the material properties of the abradable material 74 can be obtained with 60-75 vol % metal-coated microspheres which results in material density of 0.5-0.6 g/cc, elastic moduli of 200-500 psi and thermal conductivities of 1.3-2.0 W/mK.

In an exemplary embodiment, the abradable material can include 25-40 vol % elastomer matrix 76 and 60-75 vol % metal-coated microspheres 78.

A technical advantage of the disclosed thermally conductive lightweight elastomeric seal includes low incursion site temperature.

Another technical advantage of the disclosed thermally conductive lightweight elastomeric seal includes a way to reduce seal weight and to permit rub in seals which previously were pre-trenched to eliminate the issue of overheating.

Another technical advantage of the disclosed thermally conductive lightweight elastomeric seal includes improved corrosion protection.

Another technical advantage of the disclosed thermally conductive lightweight elastomeric seal includes improved bond to erosion-resistant coating.

Another technical advantage of the disclosed thermally conductive lightweight elastomeric seal includes a seal material which is extremely lightweight and has a filler content that is extremely high at >60% filler and possibly up to 75% filler.

Another technical advantage of the disclosed thermally conductive lightweight elastomeric seal includes a seal which can be co-processed with other bonding operations to streamline manufacture.

Another technical advantage of the disclosed thermally conductive lightweight elastomeric seal includes the polymer matrix is an elastomer.

There has been provided a thermally conductive lightweight elastomeric seal. While the thermally conductive lightweight elastomeric seal has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A thermally conductive lightweight elastomeric seal comprising:

a stator substrate having an external surface;

a casing coupled to the external surface, the casing including radial walls extending orthogonal radially from the external surface;

an abradable material disposed within the casing, the abradable material comprises an elastomer material with imbedded metal-coated hollow microspheres, wherein the abradable material comprises a density of 0.5 to 0.6 grams/cubic centimeter, wherein the abradable material comprises elastic moduli ranging from 200-500 pounds per square inch; and the abradable material and the casing being coupled together.

2. The thermally conductive lightweight elastomeric seal according to claim 1, wherein the casing includes a floor directly coupled to the external surface and coupled to the abradable material.

3. The thermally conductive lightweight elastomeric seal according to claim 1, wherein the elastomer material is selected from the group consisting of nitrile, polyurethane, viton and silicone.

4. The thermally conductive lightweight elastomeric seal according to claim 1, wherein the abradable material comprises thermal conductivities ranging from 1.3-2.0 W/mK.

5. The thermally conductive lightweight elastomeric seal according to claim 1, wherein the radial walls extending orthogonal radially from the exterior surface are configured to contain the abradable material within the radial walls, relative to an axis A.

6. The thermally conductive lightweight elastomeric seal according to claim 1, wherein the casing and the abradable material comprise a ratio of elastic modulus of the casing to the abradable material of 50 to 5000.

7. A thermally conductive lightweight elastomeric seal for a gas turbine engine rotor and stator comprising:

a stator substrate having an external surface;

a casing coupled to the external surface, the casing including radial walls extending radially from the external surface;

an abradable material disposed within the casing radial walls relative to an axis A, the abradable material comprises an elastomer material with imbedded metal-coated hollow microspheres, wherein the abradable material comprises a density of 0.5 to 0.6 grams/cubic centimeter, wherein the abradable material comprises thermal conductivities ranging from 1.3-2.0 W/mK; and the abradable material and the casing being coupled together.

8. The thermally conductive lightweight elastomeric seal for the gas turbine engine rotor and stator according to claim 7, wherein the metal-coated hollow microspheres are pre-treated with an adhesion promoter.

9. The thermally conductive lightweight elastomeric seal for the gas turbine engine rotor and stator according to claim 7, wherein the casing comprises a material selected from the group consisting of polyether ketone, polyether ether ketone, polyetherimide, polyamide imide, polyphenylene sulfide or polyphenylsulfone and a reinforced thermoset organic matrix composite.

10. The thermally conductive lightweight elastomeric seal for the gas turbine engine rotor and stator according to claim 9, wherein the reinforced thermoset organic matrix composite is selected from the group consisting of an epoxy or imide-based resin reinforced with at least one of a carbon fiber, a glass fiber and a fabric, wherein the fabric includes carbon or glass.

11. The thermally conductive lightweight elastomeric seal for the gas turbine engine rotor and stator according to claim 7, wherein the casing comprises neat or reinforced thermoplastic.

12. The thermally conductive lightweight elastomeric seal for the gas turbine engine rotor and stator according to claim 7, wherein the elastomer material is selected from the group consisting of nitrile, polyurethane, viton and silicone.

13. A gas turbine engine abradable seal thermal conduction process comprising:

providing a stator substrate having an external surface;

coupling a casing to the external surface, the casing including radial walls extending radially from the external surface;

disposing an abradable material within the casing radial walls relative to an axis A, wherein the abradable material comprises an elastomer material with imbedded metal-coated hollow microspheres, wherein the abradable material comprises a density of 0.5 to 0.6 grams/cubic centimeter, wherein the abradable material comprises elastic moduli ranging from 200-500 pounds per square inch; and coupling the abradable material and the casing together.

14. The process of claim 13, wherein the casing includes a floor directly coupled to the exterior surface; and coupling the floor to the abradable material.

15. The process of claim 13, wherein the casing and the abradable material comprise a ratio of elastic modulus of the casing to the abradable material of 50 to 5000.

16. The process of claim 13, wherein the elastomer material is selected from the group consisting of nitrile, polyurethane, viton and silicone.

17. The process of claim 13, further comprising:

fabricating the gas turbine engine abradable seal in-situ with low modulus abradable material loaded and cured into the casing following installation of the abradable seal.

18. The process of claim 13, wherein the abradable material comprises thermal conductivities ranging from 1.3-2.0 W/mK.

* * * * *